L. P. HARRIS.

Sugar Evaporator.

No. 249. A. I. Patented Aug. 23, 1859.

WITNESSES
P. H. Alexander
C. W. Frauzom

INVENTOR
L. P. Harris

N. PETERS, Photo-Lithographer, Washington, D. C.

UNITED STATES PATENT OFFICE.

L. P. HARRIS, OF MANSFIELD, OHIO.

IMPROVEMENT IN APPARATUS FOR EVAPORATING SACCHARINE JUICES.

Specification forming part of Additional Improvement No. 249, dated August 23, 1859, to Letters Patent No. 22,648, dated January 18, 1859.

*To all whom it may concern:*

Be it known that I, L. P. HARRIS, of Mansfield, Richland county, and in the State of Ohio, have invented certain new and useful Improvements in Sugar-Evaporators; and I do hereby declare the following to be a full, clear, and exact description of the same, reference being had to the annexed drawings and letters of reference marked thereon.

The nature of my invention consists in applying transverse partitions to evaporating-pans, for the purpose of giving longitudinal channels to the sirup, as will hereinafter be fully described.

To enable others skilled in the art to make and use my invention, I will now describe its construction and operation.

Figure 2:
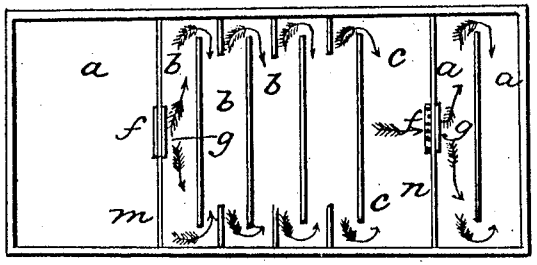
Figure 3:
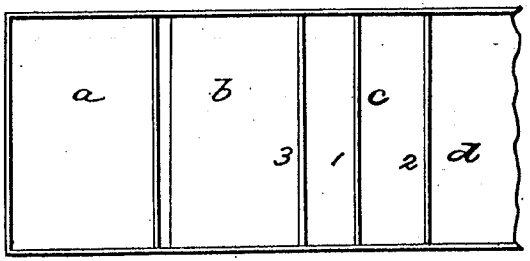
Figure 1:
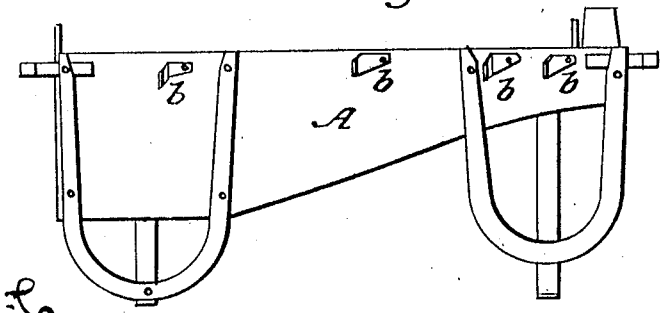

In the drawings, Figure 2 is a plan view of the pan, which is constructed of a metallic sheet in the ordinary mode of constructing shallow open evaporators, applying wooden or metallic sides. I then apply the transverse partitions *m* and *n*, dividing the pan into the heating, evaporating, and siruping departments. I then apply to the evaporating-department partial partitions, either transversely or obliquely. In the partitions *m* and *n* I apply the valves and strainers originally described. The evaporator as shown in Fig. 2 is then adjusted upon the furnace represented in Fig. 1, the dampers *a c d* in Fig. 3 corresponding with the compartments *a*, *c*, and *d* in Fig. 2. As this evaporator resembles in some degree the one described by D. M. Cook in his patent of June 22, 1858, also of my patent of January 18, 1859, and previously by others, I will proceed to describe the difference in their construction and operation.

The pan described by D. M. Cook and others is constructed with transverse partitions having alternate ends, connected and disconnected with the sides of the pan, so as to form a continuous transverse channel. Such is not the construction of my evaporator, the partial partitions having no alternate connection with the sides of the pan, consequently no continuous transverse channel.

To prevent the accumulation of the scum along the projecting sides of the pan, I apply the partial partitions *b b b* shown in Fig. 2, which obstruct its onward course, causing it to flow around their ends, thus producing a channel, as indicated by the arrows in Fig. 2, along each side of the pan. As the most rapid boiling is produced through the central part of the pan, the scum is thrown off onto the projecting surface at each side, and is carried onward by these longitudinal channels to the cooling-apartment *e* in Fig. 2, where it rises to the surface for removal.

I claim—

The application of partial transverse or oblique partitions to evaporating-pans, for the purpose of preventing a continuous transverse channel, when the said partitions shall be arranged substantially in the manner as herein fully set forth and described.

L. P. HARRIS.

Witnesses:

T. H. ALEXANDER,

C. W. FRANZONI.